US012562032B2

(12) United States Patent
Huss et al.

(10) Patent No.: US 12,562,032 B2
(45) Date of Patent: Feb. 24, 2026

(54) ASSIGNMENT OF PLAYER GROUPS AND DETERMINATION OF GROUP PAYOUTS

(71) Applicant: SidePrize LLC, Atlanta, GA (US)

(72) Inventors: Brian Huss, Atlanta, GA (US); Jingxi Peng, Atlanta, GA (US); Cole Campbell, Atlanta, GA (US); Grant Cloud, Atlanta, GA (US); Brenden Clerget, Atlanta, GA (US); Jonathan Wallace, Atlanta, GA (US); Jay Deuskar, Atlanta, GA (US)

(73) Assignee: SIDEPRIZE LLC, Atlanta, GA (US)

( * ) Notice: Subject to any disclaimer, the term of this patent is extended or adjusted under 35 U.S.C. 154(b) by 0 days.

(21) Appl. No.: 18/732,391

(22) Filed: Jun. 3, 2024

(65) Prior Publication Data

US 2025/0371945 A1 Dec. 4, 2025

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3276* (2013.01); *G07F 17/3237* (2013.01); *G07F 17/3244* (2013.01); *G07F 17/3288* (2013.01)

(58) Field of Classification Search

CPC ... G07F 17/32; G07F 17/3214; G07F 17/3222

USPC .............................. 463/1, 20, 22, 25, 30, 39

See application file for complete search history.

(56) References Cited

U.S. PATENT DOCUMENTS

2009/0026706 A1* 1/2009 St. Clair ................ G07F 17/32 700/91
2013/0079073 A1* 3/2013 Sharifi .................... A63F 13/45 463/3
2013/0225299 A1* 8/2013 Lockton .............. G07F 17/3288 463/42
2016/0271501 A1 9/2016 Balsbaugh
2019/0333338 A1* 10/2019 Hirsch ................ G07F 17/3288
2021/0001227 A1* 1/2021 Farudi ................... A63F 13/812
2021/0209899 A1* 7/2021 Gordon ................... A63F 13/35
2022/0212090 A1* 7/2022 Malnar ............... G07F 17/3293
2023/0334957 A1* 10/2023 Owoyemi ........... G07F 17/3288

OTHER PUBLICATIONS

International Search Report and Written Opinion received in International application No. PCT/US24/32453 mailed on Sep. 3, 2024.

* cited by examiner

*Primary Examiner* — Adetokunbo O Torimiro

(74) *Attorney, Agent, or Firm* — Bradley Arant Boult Cummings LLP; Adam J. Thompson

(57) ABSTRACT

The disclosed system discussed herein may include systems and methods for forming player groups for a peer-to-peer (P2P) fantasy sports contest based on one or more of selections by the user (e.g., selected projections or selected entry fees) and historical participation (e.g., skill, experience, etc.), and determining group payouts based on payout selection criteria, experience, and skill level of individual group members.

20 Claims, 6 Drawing Sheets

ASSIGNMENT OF PLAYER GROUPS AND DETERMINATION OF GROUP PAYOUTS

TECHNICAL FIELD

The present disclosure generally relates to systems and methods for forming player groups and determining group payouts and, more specifically, to forming player groups based on one or more of selections by the user (e.g., selected projections or selected entry fees) and historical participation (e.g., skill, experience, etc.), and determining group payouts based on payout selection criteria, experience, and skill level of individual group members.

BACKGROUND

Traditional fantasy sports games have provided fans with a platform to engage more deeply with their favorite sports, creating virtual teams from real players based on their performance statistics to compete against other fantasy teams. Historically, these fantasy sports contests have been organized by operators (e.g., entities managing one or more fantasy sports contests) that set the rules, scoring systems, and often the entry fees. While this structure has popularized fantasy sports among a wide audience, it inherently limits customization and flexibility. Participants are bound by the platform's predefined rules and entry fees, which may not align with all users' preferences for competitive strategy. This one-size-fits-all approach fails to accommodate the diverse needs and skill levels of participants, from novices looking for casual play to seasoned enthusiasts seeking more challenging and tailored experiences.

The advent of peer-to-peer (P2P) fantasy sports contests aims to address these limitations by offering a platform where users have the autonomy to define their competition parameters. This model shifts the control from the operators to the users themselves, enabling a more personalized and engaging fantasy sports experience. However, operators are faced with numerous technical needs and challenges associated with offering platforms for P2P fantasy sports contests. These unaddressed technical needs and challenges include facilitating matching of users into groups to ensure fair and competitive grouping, as well as calculating and distributing payouts to winners within the groups.

Accordingly, there is an unresolved need for systems and methods for handling complex user inputs and preferences to ensure fair and competitive groupings in P2P fantasy sports contests, as well as calculating and distributing payouts to winners within the groupings.

This background information is provided to reveal information believed by the applicant to be of possible relevance. No admission is necessarily intended, nor should be construed, that any of the preceding information constitutes prior art.

SUMMARY

Briefly described, and in various embodiments, the present disclosure generally relates to systems and methods for forming player groups in P2P fantasy sports contests and determining group payouts based on payout selection criteria, experience, and skill level of individual group members. The disclosed system may include a computing infrastructure for processing, administering, and providing a virtual infrastructure for forming player groups and determining group payouts based on payout selection criteria, experience, and skill level of individual group members. The disclosed system may include a computing environment, a client device, and various external resources.

The envisioned systems, methods, and computing devices for a peer-to-peer fantasy sports game innovatively addresses the formation of player groups and the determination of group payouts, seamlessly integrating criteria based on a number of players in a selected lineup (e.g., between 2 and 6 players), the sports the selected players participate in, the timing of the selected players' scheduled games, and/or the experience and skill levels of its participants. This experience and/or skill levels of the participants may be assessed based on a number of contests played and amounts won, as well as whether any projections for those players are deemed significantly more or significantly less likely than even probability.

The client device of the disclosed system may include a computer, a laptop, a desktop, a tablet device, a cellular device, and/or any other system capable of communicating with the computing environment. The client device may render a user interface such that a user may select players for their fantasy lineups. The system may employ algorithms and data analytics to analyze each user's selections, including chosen players, specified outcomes (e.g., "more" or "less"), and entry fees, to match players into competitive groups. The system may form each group to ensure fairness and competitive balance by taking into account not only the users' chosen difficulty levels but also their historical performance and skill level within the platform. Moreover, entry fees chosen by users may influence group formation and outcomes. Any combination of these factors may be used to create and adjust groups, enhancing the strategic elements of game play. The system's dynamic nature allows for the adjustment of payout structures based on the aggregated profile of the group, ensuring that rewards are proportionate to the challenges undertaken by the participants.

Upon accessing the user interface, users may be presented with an array of players and upcoming sporting events, alongside relevant statistics and performance data. Users may then evaluate and construct their lineups by applying their analytical skills to predict which players will exceed certain performance thresholds. For example, a user might predict whether a soccer player will score more or fewer than 2.5 goals in a match based on a comprehensive analysis of the player's past performance and current conditions. Users then assemble their selections into a fantasy game, which requires the outcomes of multiple players to influence the results, ensuring that no single player or team outcome solely determines the results. The user interface may offer additional information and guidance on how these selections influence the game's dynamics, enhancing the user's engagement and satisfaction with the platform.

Group formation may be determined, and payout determination may be performed through a transparent and rigorous process. Once users have made their selections and submitted their entry fees, the system analyzes the data, grouping users with similar difficulty preferences and comparable skill levels. This may be achieved by evaluating the difficulty levels users are willing to take (e.g., greater or lesser outcomes), their historical success rates, and their overall engagement with the platform. Moreover, users may be grouped based on a number of players in the users' selected lineups (e.g., between 2 and 6 players), the sports the selected players participate in, and/or the timing of the selected players' scheduled games. The system may then determine potential payouts for each group, dynamically adjusting the potential payouts based on the difficulty levels undertaken by the group members, the total pool of entry fees, and standardized payout ratios. The payout for winning participants may be determined post-event, based on actual outcomes and the predefined criteria, ensuring that the distribution of rewards is both fair and reflective of the competitive dynamics of each group, thereby fostering an environment of equity and excitement among fantasy sports enthusiasts.

The computing environment may access external resources to gather data associated with players, lineups, weather, third-party data, and/or any other data that is associated with the disclosed system. These resources may include sports analytics databases, weather forecasting services, and/or player performance tracking platforms, as well as news outlets that provide real-time updates on player conditions, game schedules, and other relevant factors that could influence the outcomes of the contests. By integrating application program interfaces (APIs) from these external sources, the system may automate the collection and processing of vast amounts of data, ensuring that all information used for establishing processing parameters, calculating scores, and adjusting payouts is current, accurate, and comprehensive. This capability not only enhances the system's responsiveness and reliability but also enriches the user experience by providing a more informed and dynamic gaming environment, where decisions can be made based on a holistic view of all factors affecting game outcomes.

According to an aspect, a system, a method, computing device(s), and/or a computer readable medium may communicate with a data store. A plurality of processing parameters may be established for accepting entries in a Peer-to-Peer (P2P) fantasy sports content, determine user levels based on historical participation and success, match users into groups with similar levels for fairness, receive users' pick selections, calculate scores based on pick outcomes, identify the group's highest scoring entry, and award payouts based on the correct picks within that top entry. This multifaceted approach may ensure a dynamically competitive environment tailored to participant skill levels and engagement history, promoting fairness and incentivizing strategic gameplay.

According to a further aspect, scores may be adjusted based on tied picks or Did Not Play (DNP) scenarios. This adjustment may include modifying the total score of a user's entry in the event of unforeseen circumstances affecting selected players, ensuring that the scoring system remains equitable and reflective of each user's strategic selections despite external variables.

According to a further aspect, user levels may be dynamically updated based on ongoing participation and outcomes in the contests. This dynamic adjustment may reflect the current skill and experience levels of users, ensuring that participants are matched with peers offering similar competitive challenges and opportunities for growth, thereby enhancing user satisfaction and engagement over time.

According to a further aspect, determining the highest scoring entry may include handling ties by equally dividing the payout among users with the highest tied scores. This approach to tie resolution may ensure fairness in the distribution of winnings, recognizing the equal performance of top participants and maintaining a positive competitive spirit within the group.

According to a further aspect, a multiplier may be employed for the payout based on the number of correct picks, where the multiplier increases with the number of correct picks. This may incentivize users to make more accurate selections, rewarding strategic insight and knowledge with progressively higher payouts, thereby enhancing the engagement and excitement of participation.

According to a further aspect, the multiplier may be adjusted for entries that include picks from the same team or game to reflect decreased prediction difficulty. This nuanced approach acknowledges the dynamics of forecasting outcomes within closely linked events and adjusts rewards to account for an increased likelihood of correlated events occurring simultaneously. For example, if a participant selects two players from the same soccer game, and one scores a goal, the chances of the game being high-scoring and thus affecting other player outcomes may also increase. Therefore, the system might reduce the payout multiplier, recognizing that the correlation between events in a single game typically reduces the challenge of accurate prediction.

According to a further aspect, picks available for selection may be filtered based on real-time data to prevent selection of picks that are no longer viable due to game changes or player availability. This proactive filtering may ensure that users make informed choices based on the latest information, maintaining the integrity and relevance of the contest selections.

According to a further aspect, filtering may include removing picks related to players determined to be non-participants shortly before the contest starts, safeguarding users from selecting options that could unfairly impact their scores and chances of winning due to last-minute lineup changes or player injuries.

According to a further aspect, a real-time leaderboard may be generated for each group to display current standings and scores throughout the contest period. This feature fosters a sense of immediate competition and community among participants, encouraging active engagement and strategic adjustments as the contest progresses.

According to a further aspect, the leaderboard may update dynamically in response to real-time events affecting the outcomes of selected picks. This responsiveness may ensure that the leaderboard remains an accurate and up-to-date reflection of the contest's competitive landscape, enhancing the immersive experience of the game.

According to a further aspect, a user interface may be provided that allows users to track their progress, including wins, losses, and current user level. This transparency in performance tracking may enable users to assess their strategies, celebrate achievements, and identify areas for improvement, deepening their engagement with the platform.

According to a further aspect, the user interface may further allow for the modification of picks up to a predetermined cut-off time before the start of the contest, offering flexibility and the opportunity for users to adjust their strategies based on latest developments or insights, thereby increasing their sense of control and investment in the contest outcomes.

According to a further aspect, a feedback mechanism may be implemented for users to report issues or discrepancies in scoring or payout. This feedback mechanism may encourage user interaction and trust, ensuring that any concerns are promptly addressed and that the platform remains fair and transparent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

Reference will now be made to the accompanying drawings, which are not necessarily drawn to scale.

Figure 1:
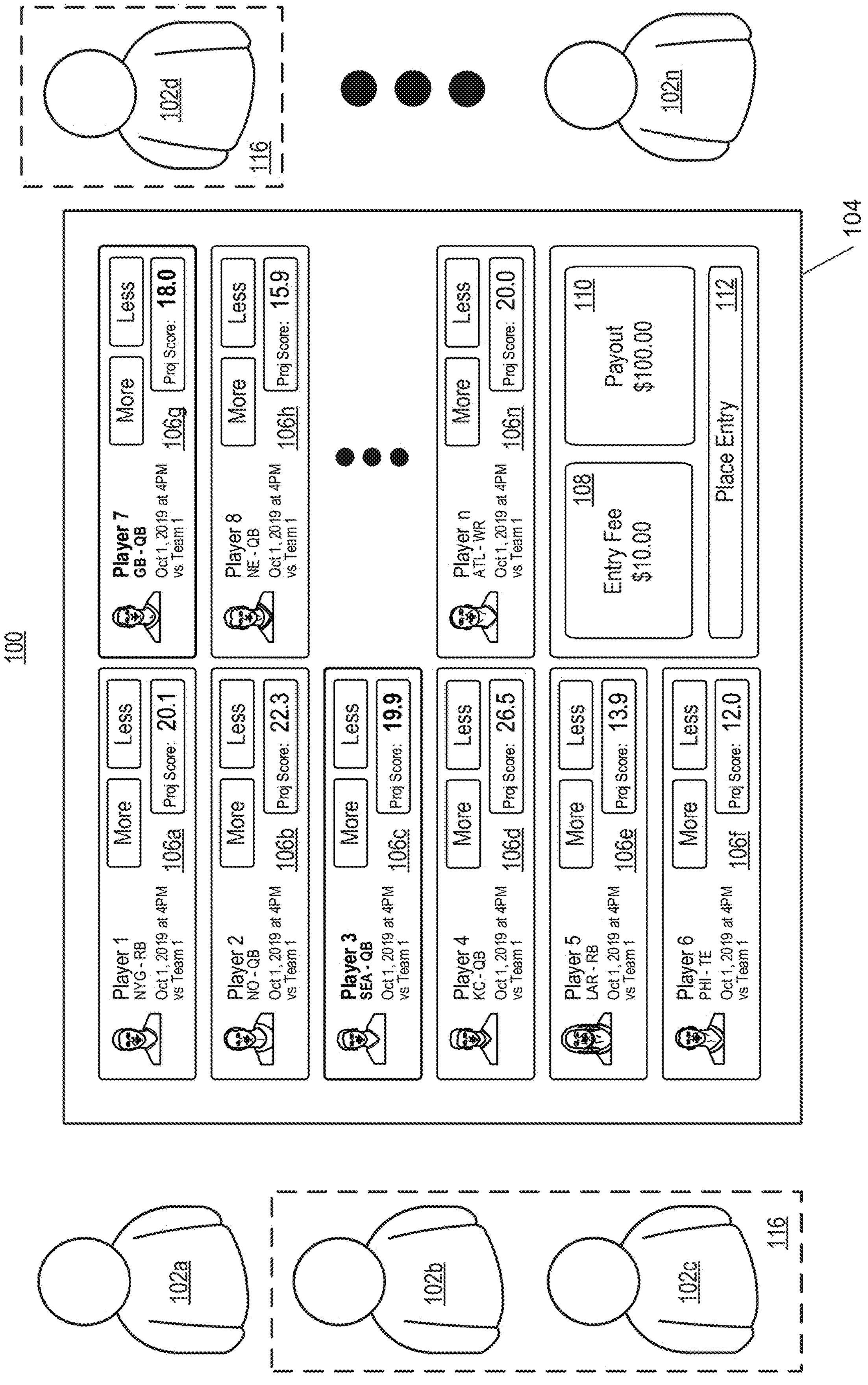
FIG. 1 illustrates an exemplary player selection interface according to various embodiments of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

User. A consumer interacting with a particular product (e.g., a fantasy sports contest).

Operator. An entity representing a contest (e.g., a fantasy sports contest) operator or organizer.

Lineup. The collection of squares submitted by a user into the operator's contest in an attempt to win the contest's prize.

Square. A single component of a lineup, based on the performance of an individual player or a combination of players.

Offer. A submission of a lineup made to the contest operator.

Correlation. The degree to which two or more quantities are quantitatively related to one another.

Correlation Value. A measurement of correlation which may be a number between 1 and −1. A number close to 1 may mean two factors are positively correlated (e.g., they may rise or fall together and at a similar magnitude), a number close to −1 may mean the two factors are oppositely correlated (e.g., they may rise or fall oppositely and at a similar magnitude), and a number closer to 0 may mean that the two factors may be mostly random to each other, therefore not significantly correlated.

Related Contingencies. Any lineup comprising squares within a correlation value that is not equal to zero (e.g., a related contingency may be any lineup that comprises square(s) associated with any sort of dependent event).

Payout. An amount of value, relative to the lineup and associated entry fee, which will be rewarded upon a win.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

The disclosed system represents a groundbreaking approach to P2P fantasy sports contests, leveraging a sophisticated computing infrastructure to orchestrate the formation of player groups and the calculation of group payouts. The disclosed system may assess and integrate various criteria, including payout selection, the experience of participants, and individual skill levels, ensuring that each group is evenly matched and that payouts accurately reflect the competitive landscape of the contest. The disclosed computing environment may facilitate the processing and administration of the P2P fantasy sports contests and may be supported by client devices and external resources that enrich the data pool used for decision-making.

Client devices may offer users a versatile platform for interaction and engagement with the P2P fantasy sports contests. Whether through a computer, laptop, tablet, or smartphone, users may interact with a user interface to select players and lineups within the P2P fantasy sports contest. The user interface may simplify user participation and may enhance the P2P fantasy sports experience by providing a direct link between the user's strategic decisions and the computing environment's processing capabilities. Through the client devices, users may effectively communicate their choices and preferences to the system, which are then meticulously analyzed to match users into appropriately competitive groups.

The disclosed method for forming player groups and determining payouts may include analyzing user selections, including players and specified outcomes, and integrating the user selections with historical performance data and skill levels, ensuring that all participants are placed into groups where competitive fairness is maintained. A challenging and equitable P2P fantasy sports contest may be provided through a balance of factors, including user-defined difficulty levels and/or entry fees. Adjustment of payout structures based on the collective difficulty profile of each group may introduce a layer of strategic depth to the contests, encouraging participants to engage more deeply with the fantasy sports experience.

The disclosed system may inform its processing parameters and decision-making processes by accessing datasets from one or more external resources. Accessing data on player performance, game conditions, weather, and other relevant factors, the system may ensure that its operations are based on up-to-date and comprehensive information. This access may enable the system to adjust dynamically to real-world sports developments, thereby enhancing the accuracy of group matchups and payout determinations. The integration of these resources, facilitated through APIs and other data exchange mechanisms, may ensure that the disclosed system remains responsive and adaptable to the changing landscape of sports events and player conditions.

The described system heralds a new era in P2P fantasy sports gaming, offering a platform that is both technologically advanced and user-centric. By providing an intuitive client interface and leveraging extensive external data resources, the disclosed system may provide a seamless and engaging experience for fantasy sports enthusiasts. Consideration given to the formation of player groups and the calculation of payouts, based on a myriad of factors including user experience and skill level, may ensure that each P2P fantasy sports contest is both fair and competitive. This innovative approach not only enhances the enjoyment and satisfaction of participants but also sets a new standard for the organization and administration of P2P fantasy sports contests.

Referring now to the figures, for the purposes of example and explanation of the fundamental processes and components of the disclosed systems and processes, reference is made to FIG. 1, which illustrates an environment 100 for a P2P fantasy sports contest including a player selection interface 104. As will be understood and appreciated, the player selection interface 104 shown in FIG. 1 represents merely one approach or aspect of the present concept, and other aspects are used according to various embodiments of the present concept.

According to some aspects, the environment 100 for a P2P fantasy sports contest my comprise a comprehensive platform catering to the nuanced needs of fantasy sports enthusiasts (e.g., users 102*a*-102*n*), cumulatively referred to as users 102. The users 102 may range from casual participants to seasoned veterans. As shown in FIG. 1, a player selection interface 104 may provide an interface for users 102 to delve into the strategic aspects of fantasy sports by selecting a number (e.g., n) of players (e.g., players 106*a*-106*n*), cumulatively referred to as players 106, for their lineups. Users 102 may interact with the player selection interface 104 through a variety of devices (e.g., client device 350 illustrated in FIG. 3), broadening accessibility and ensuring that users 102 may engage with the player selection interface 104 from any number of devices or locations.

The player selection interface 104 may render a roster of players 106, each participating in a myriad of sporting events across different leagues and tournaments. For example, the players 106 may include one or more of athletes from major leagues such as the National Football League (NFL), Major League Baseball (MLB), National Hockey League (NHL), as well as esports competitors from League of Legends and soccer players from global competitions like La Liga and the Champions League. The diversity of players 106 may ensure that users have a broad spectrum of options for crafting their fantasy lineups, ranging from analyzing a soccer player's performance in the Major League Soccer (MLS) league to predicting outcomes for a baseball player in the World Series. The player selection interface may allow for the inclusion of players 106 involved in events on the same day, distinct days, or multiple instances of the same player across different events, providing users 102 with flexibility in lineup creation.

The player selection interface 104 may prompt the users 102 to make predictions on outcomes based on associated events, introducing a strategic layer to the selection process. Outcomes may be presented as selectable results, such as predicting whether a football quarterback will throw more or less than three touchdowns in an upcoming game. This system of outcome selection may be further enriched with options for occurrence and non-occurrence selections, alongside a 'hit' selection for precise predictions. Such detailed prognostication opportunities may empower users 102 to engage deeply with the sports they love, challenging their analytical skills and understanding of each sport's nuances.

Lineup selection within the player selection interface 104 may introduce another strategic dimension, where users 102 may define the size of their lineup, choosing from a range of squares that may include two or more players and their associated events. Users 102 may weigh the likelihood of correctly predicting outcomes across a larger set of selections against the potential for higher rewards. This balance between the likelihood of winning and the variance in the payout multiplier may enhance the appeal of the P2P fantasy sports contest, offering a compelling challenge that resonates with both new and experienced users alike.

Upon selecting their lineup, users 102 may be prompted to choose an entry fee 108, with the interface displaying the potential payout 110 associated with their selections and the chosen entry fee 108. The inclusion of a submission selection 112 may allow users to finalize and submit their lineup into the contest, marking the culmination of their strategic deliberations. By providing the users 102 with detailed information regarding their selected projections, the player selection interface 104 may ensure that users 102 are fully informed of the potential payouts, fostering an environment of transparency and strategic engagement.

Skill and experience attributes associated with each of the users 102 may play a pivotal role in enhancing competitive fairness within the P2P fantasy sports contest environment. By evaluating each user's historical participation and success, the system may group the users 102 with similar skill levels and experience, ensuring that contests are balanced and equitable. For instance, users 102*b*, 102*c*, and 102*d*, with comparable records of participation and achievement, may be formed into a group 116. This methodical approach to group formation may ensure that every contest is a fair competition, where users 102 are matched against opponents with similar abilities and experience levels, thus maximizing the enjoyment and satisfaction derived from each contest.

The incorporation of skill and experience attributes into group formation is further illustrated by the example of users 102*b*, 102*c*, and 102*d* being formed into a group 116. This grouping mechanism, detailed further in FIG. 2, exemplifies the disclosed system's commitment to creating a balanced competitive landscape. By carefully analyzing each user's historical data, the disclosed system may facilitate the creation of groups where the competition is keen yet fair, allowing users 102 to engage in contests that are both challenging and rewarding.

Figure 2:
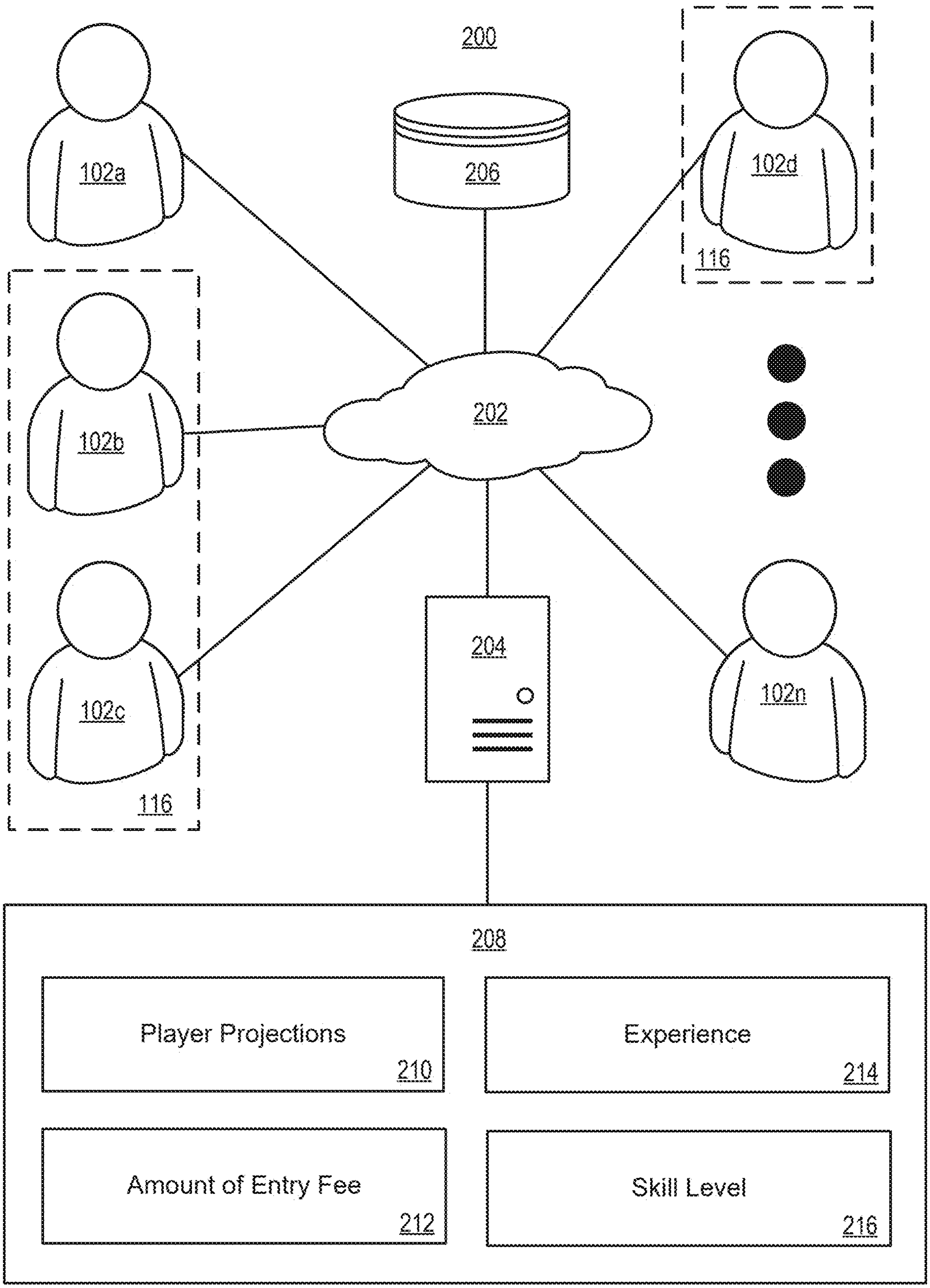
FIG. 2 illustrates an exemplary networked environment according to various embodiments of the present disclosure.

As shown in FIG. 2, an environment 200 for a P2P fantasy sports contest may facilitate interactive and competitive gaming among a diverse user base ranging from user 102*a* to user 102*n* (e.g., cumulatively denoted as users 102). The environment 200 may include a network 202, a server 204, and a database 206. The individual elements of the environment 200, working in concert, may deliver a seamless and engaging fantasy sports experience, leveraging advanced algorithms and data analytics to match users 102 in fair and competitive groups based on a variety of criteria.

The network 202 may provide a versatile and dynamic conduit that enables communication and data exchange across the environment 200. The network 202 may encompass a wide range of connection types, including wired, wireless, and cloud-based technologies, ensuring that users 102 may access the P2P fantasy sports contest platform from virtually anywhere. This connectivity may support real-time interactions and updates, allowing users 102 to make informed decisions based on the latest available information.

According to some aspects, the server 204 may act as a central processing unit within the environment 200, orchestrating the myriad operations necessary to run the P2P fantasy contests efficiently. The server 204 may handle tasks ranging from user authentication and data processing to the execution of complex algorithms that power a group formation module 208. Moreover, the server 204 may manage flow of information between users 102 and the system, ensuring that user selections and other inputs are accurately recorded and reflected in the contest outcomes.

The database 206 may store a vast array of information associated with the operation of the P2P fantasy sports contests. For example, the database 206 may comprise one or more of user profiles, historical performance data, player statistics, contest results, and other data points. By maintaining a comprehensive and up-to-date repository of information, the database 206 may enable the server 204 to perform detailed analyses and make informed decisions regarding group formations and contest dynamics.

The group formation module 208 may be a software component and/or a specialized component, operating with the server 204 or within the server 204. The group formation module 208 may analyze user data and determine the optimal grouping of the users 102 for each contest. Using advanced algorithms, the group formation module 208 may evaluate criteria such as the player projections 210 (e.g., number of players, sport associated with players, and/or timing of events associated with players), entry fee 212, experience 214, and skill levels 216 to match users into groups that are balanced in terms of competitive fairness. The group formation module 208 may ensure that each user is placed in a contest environment that matches their proficiency and engagement level, promoting a fair and enjoyable gaming experience for all participants.

The player projections 210 may be used by the group formation module 208 to consider the scope and depth of each user's engagement with the fantasy contest. The player projections 210 may include aspects such as the number of players in a selected lineup (e.g., ranging from 2 to 6 players), the sports involved, and/or the timing of the games. According to some aspects, a user may select lineups from diverse sports like football, basketball, and baseball. For instance, the user might select a lineup of five football players with games scheduled over the weekend. This selection, combined with an entry fee chosen by the user and/or the rarity of player performance projections, may provide indications of the user's appetite for a complex and strategic contest experience.

The amount of entry fee 212 may be used by the group formation module 208 to consider the level of investment and difficulty the users 102 are willing to undertake for a particular contest. By analyzing this data, the group formation module 208 may group users with similar financial commitments together, ensuring that the parameters and/or payouts of the contest are aligned with the participants' preferences and expectations.

The experience 214 criterion may be used by the group formation module 208 to assess each user's historical participation and success within the platform. Such assessment may allow the group formation module 208 to identify users who have a similar depth of engagement with the contests, grouping novices with other beginners and veterans with their more experienced counterparts. This stratification may help maintain competitive balance and enhance user satisfaction by matching participants with peers of similar proficiency.

Skill level 216 may be determined through an analysis of users' past performance, contest outcomes, and other relevant metrics. This criterion enables the group formation module 208 to gauge the relative ability of users 102, ensuring that groups are composed of players with comparable skill sets. This not only fosters fair competition but also challenges users to improve their gameplay and strategic decision-making over time.

As shown in FIG. 2, an example of the group formation process involves users **102*b*, 102*c*, and 102*d* being grouped into group 116 based on their respective player projections 210 (e.g., number of players, sport associated with players, and/or timing of events associated with players), amount of entry fee 212, experience 214, and skill level 216. For example, user 102*b* is a seasoned player with high skill levels and prefers contests with a higher entry fee and a broad range of player projections. User 102*c* may be of similar experience and skill level but opts for a slightly lower range of player projections and entry fee. User 102*d*, while less experienced, shows potential and willingness to engage at a level comparable to users 102*b* and 102*c*, based on a recent improvement in skill level and a matching entry fee preference. Moreover, the selected player projections of each of the users may be associated with the same sport (e.g., NFL players) and may be associated with the same events or events occurring within a threshold time period (e.g., events occurring over the same weekend). The group formation module 208** may assess these criteria and determine that grouping these users together would provide a competitive yet balanced contest experience for them, leveraging their similarities and differences to enhance the overall contest dynamics.

Figure 3:
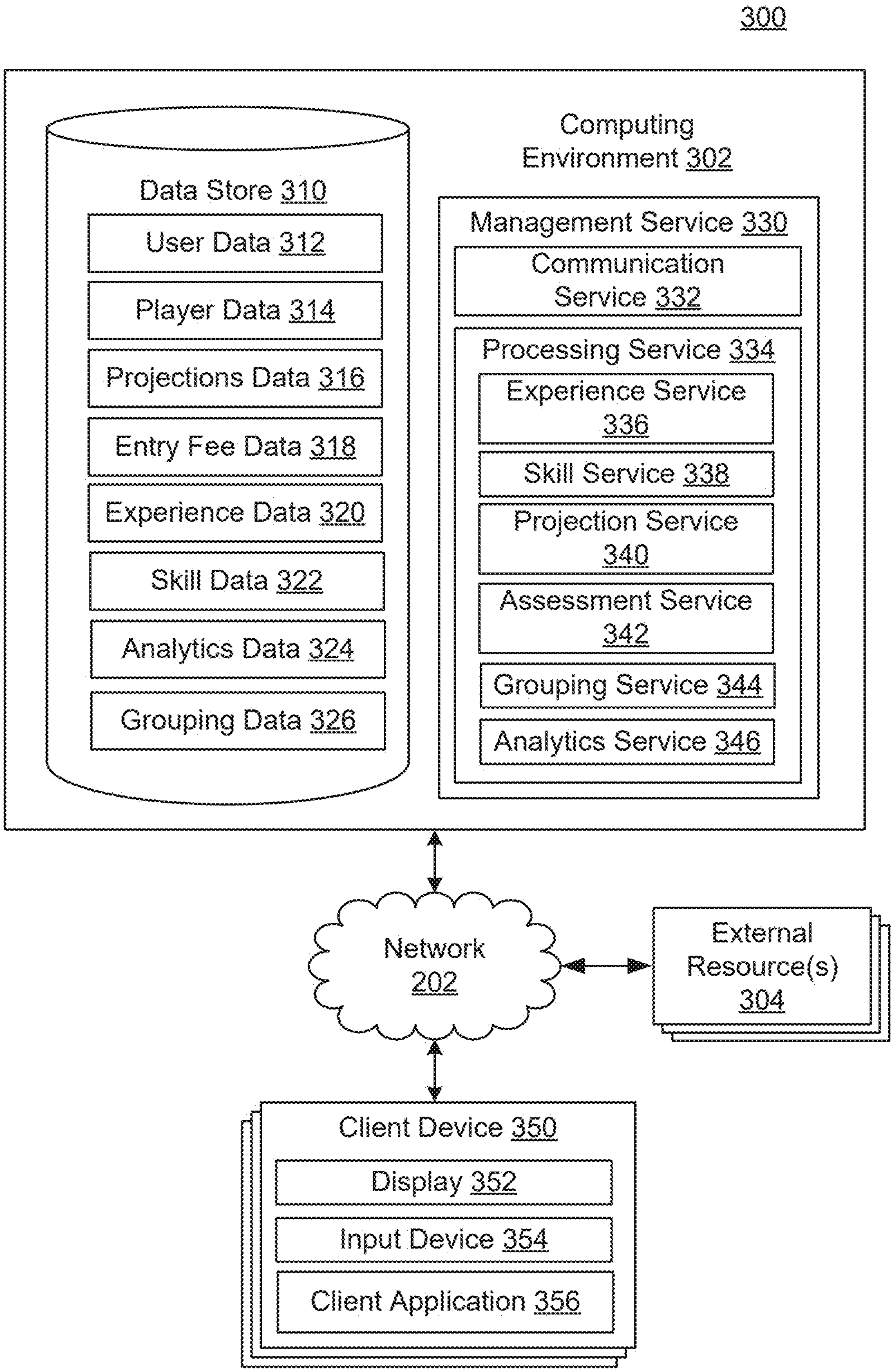
FIG. 3 illustrates an exemplary networked environment according to various embodiments of the present disclosure.

As shown in FIG. 3, the networked environment 300 may facilitate a P2P fantasy sports contests, providing users 102 with a robust, interactive gaming experience. This networked environment 300 may include a computing environment 302, external resources 304, and client device 350, one or more of which may be interlinked via a network 202. One or more of the client devices 350 may comprise a display 352, input device 354, and/or a client application 356. Network 202, including one or more of the Internet, LANs, WANs, and wireless connections, may provide communication within the networked environment 300, including real-time data exchanges, updates, and interactions.

The computing environment 302 may operate within a single device or may span across multiple devices or servers. These devices, potentially distributed across different locations, may work collectively to process, administer, and manage the functionalities associated with the P2P fantasy contests. Moreover, the computing environment 302 may adapt to the computational demands, making it an elastic resource capable of scaling according to the operational needs of the fantasy sports platform. It handles crucial tasks such as lineup processing, outcome determinations, payouts distributions, and analytical data management, positioning it as the central node of the networked environment.

The data store 310 may serve as a repository for an array of data types associated with the fantasy contest's operation, including user data 312, player data 314, projections data 316, entry fee data 318, and various other datasets that may contribute to the P2P fantasy gaming experience.

The user data 312 may include an array of information related to the users 102, enabling tailored experiences and maintaining a high level of service integrity and security. User data 312 may include personal and account-related details, such as names, usernames, passwords, and contact details (e.g., email addresses and phone numbers). User data 312 may be used for account creation, user identification, and communication purposes, allowing for personalized user profiles or ensuring that communications, such as notifications or updates about the contests, are accurately directed.

User data 312 may include other user details such as addresses, social security numbers, and birth dates. These pieces of information may be associated with verifying the identity of users, enhancing the security of the platform, or ensuring compliance with legal and regulatory requirements. For example, verifying a user's age may be associated with restricting access to a fantasy sports contest according to legal age limits for participating in fantasy sports contests.

According to some aspects, user data 312 may include banking and financial information relating to monetary transactions. For example, details such as bank account numbers, credit/debit card information, or payment histories may be associated with processing of entry fees, distribution of payouts, or management of user funds. The financial data may be used to facilitate a transactional experience, ensuring users can participate in P2P fantasy sports contests and receive their winnings. Moreover, user data 312 may include tax information related to the users 102. The tax information may be associated with ensuring compliance with tax laws and regulations. For example, tax information may be used to assist users who achieve significant winnings in fulfilling their tax obligations related to their participation in the fantasy sports contests.

Moreover, user data 312 may include device-related information such as Internet Protocol (IP) addresses and Media Access Control (MAC) addresses of client device 350. This device-related information may be associated with monitoring and analysis of user access patterns, contributing to the platform's security measures by helping to detect and prevent unauthorized access or fraudulent activities.

User data 312 may include social media information and alternate account login details (e.g., through Apple or Google accounts), allowing for integration with broader digital ecosystems. This information may be associated with one or more of streamlining the login process, enhancing user convenience, or facilitating social interactions, fostering a connected and community-oriented user experience.

Player data 314 may include detailed information about the athletes around which the P2P fantasy sports contests revolve. Player data 314 may include performance statistics, team affiliations, and event-specific data that users 102 may leverage to make informed decisions when forming their fantasy lineups. By pulling in this data from external resources 304, the computing environment 302 may ensure that users 102 have access to current and comprehensive player information.

According to some aspects, player data 314 may include identification and contextual information about athletes, including but not limited to, the player's name, the team they represent, the sport they participate in, and their specific role or position within the team. This athlete information may be associated with allowing users 102 to recognize and select players based on team compositions, individual preferences, or strategic considerations aimed at optimizing their fantasy team's performance. Player data 314 may further integrate a broad spectrum of performance statistics for each athlete. These statistics may provide quantitative measures of a player's contributions to their team's efforts, including scoring, assists, defensive achievements, and other relevant performance metrics. Detailed statistical information may enhance the fantasy sports experience by influencing the points accrued by users' fantasy teams based on real-world athlete performances.

To further enrich the decision-making process, player data 314 may include additional contextual variables that may influence an athlete's performance. These contextual variables may include data on a player's teammates, the leagues and competitions they are involved in, and upcoming sporting events they are scheduled to participate in. This additional layer of information may offer users 102 insights into the dynamics of team synergy, the competitive landscape of various leagues, and the strategic importance of specific events, all of which may inform more nuanced player selection strategies. Moreover, player data 314 may account for environmental factors such as the geographical location of sporting events and prevailing weather conditions, recognizing their potential impact on game outcomes and individual performances. For example, athletes may exhibit varying performance levels under different weather conditions or at specific venues, influencing the strategic selection of players for fantasy teams.

Historical performance data and analytics included in player data 314 may afford users 102 a deeper exploration into an athlete's performance trends and potential. Historical data may highlight patterns and consistency in performances over time, while analytics may offer predictive insights, equipping the users 102 with advanced tools to gauge future performance probabilities. Player data 314 may be dynamically maintained, with continuous updates from a variety of external resources 304, such as sports statistics databases and event data feeds, ensuring that the platform delivers the most current and comprehensive player information possible, enabling users to base their fantasy team selections on the latest available data.

Projections data 316 and entry fee data 318 further refine the contest dynamics by encapsulating the predictive aspects of the contests and the financial commitments made by users. These data points influence the formation of lineups and the structuring of contest payouts, making them fundamental to the strategic depth of the P2P fantasy contests.

Projections data 316 may encompass selections made by users 102 concerning player performances within the framework of P2P fantasy sports contests. This dataset may include information associated with users' predictions, such as a number of players selected, which sport(s) are associated with the selected players, and/or timing of events associated with the selected players. Moreover, the projections data 316 may include a collection of users' predictions on various aspects of athletes' performances in upcoming games, including, but not limited to, points scored, yards gained, goals made, assists, rebounds, and other sport-specific performance metrics. These projections reflect the users' expectations and strategic choices, based on their analysis or intuition about future sports events.

The projections data 316 may be associated with enabling the system to match users in competitions, calculate potential outcomes, and determine payouts based on the accuracy of these user-generated projections. Each entry in the projections data 316 may be linked to specific users and their selected athletes, providing a detailed map of the competitive landscape within the platform. Moreover, projections data 316 may serve as an input for algorithms that assess and rank user performance, facilitate matchmaking in contests, and contribute to the overall gaming strategy. By aggregating and analyzing these user selections, the system may offer insights into popular trends, potential sleeper picks, and widely anticipated outcomes, enriching the community's collective intelligence.

Projections data 316 may be continuously updated with new user selections and may be maintained to ensure data integrity and relevance. Initial projections may be captured, as well as accommodating changes users might make up to a cut-off time before the actual sporting events, reflecting late-breaking news or last-minute strategic adjustments. As such, projections data 316 may evolve with the sports calendar and the participatory dynamics of the P2P fantasy sports contests, serving as a component of the platform's engagement mechanics and its appeal to users seeking a deeply interactive and competitive P2P fantasy sports experience.

Entry fee data 318 may include data associated with the selection of entry fees by users 102 for participation in P2P fantasy sports contests. The entry fee data 318 may represent the financial engagement of users with the platform, recording the entry fees users are willing to commit to compete in various fantasy contests. Entry fee data 318 not only captures the amount selected by each participant but also provides data for the economic model of the P2P fantasy sports platform. By aggregating these financial commitments, the system may structure its prize pools, ensure competitive balance, and tailor contests to meet diverse user preferences.

Moreover, entry fee data 318 may serve as an input for several operational and analytical processes within the system. The entry fee date may be used in the calculation of contest payouts, ensuring that winnings are distributed based on predefined criteria reflective of the contest's parameters and participant performance. Furthermore, entry fee data 318 may offer insights into user behavior, enabling the platform to identify trends in contest participation, assess user risk tolerance, and optimize the contest offerings to enhance user engagement and satisfaction.

Experience data 320 may include a comprehensive history of user participation and performance within the P2P fantasy sports contests environment. The experience data may be used by the system to determine a trajectory of each user's engagement with the one or more fantasy sports contests, from their inaugural contest to their most recent participation. For example, the experience data 320 may include, but is not limited to, the frequency of contest participation, types of sports engaged in, performance metrics such as wins, losses, and overall standings, as well as more nuanced insights like strategic preferences and adaptation to contest dynamics over time. By systematically capturing and updating this user-centric historical ledger, the system may gain insight into the evolving competencies and engagement levels of its users.

Furthermore, experience data 320 may be used for personalizing the user experience and ensuring fairness in contest matchmaking. The experience data 320 may be used by algorithms to match users with similar experience levels, thereby fostering a competitive yet equitable contest environment. Additionally, the experience data 320 may be used to tailor its content and recommendations to align with the users' skill progression and interests, thereby enhancing user retention and satisfaction. The strategic utilization of experience data 320 underscores its vital role in optimizing the operational efficiency of the platform and enriching the user experience by providing a personalized and balanced competitive landscape.

Skill data 322 may include a quantifiable measure of the users' prowess in participating in P2P fantasy sports contests. This skill data may comprise an aggregation of users' successes, such as wins or high rankings in contests, alongside a detailed analysis of their skill levels across various aspects of the fantasy sports domain. By incorporating both historical performance outcomes and a nuanced examination of strategic decisions made by users in different contest scenarios, skill data 322 may serve as a dynamic indicator of each user's competence and proficiency within the P2P fantasy sports platform.

Moreover, skill data 322 may be associated with facilitating a balanced and competitive matchmaking process by allowing the system to rank or categorize users into different skill tiers. This categorization may ensure that users are matched with opponents of comparable skill levels, enhance the fairness and challenge of the contests, and aid in the personalization of content, recommendations, and potential training or improvement resources offered to users. The adaptive nature of skill data 322, which evolves with each user's performance and participation, may be used to maintain the integrity and appeal of the P2P fantasy sports contests environment by promoting equitable competition and fostering a pathway for continuous skill development and engagement.

The management service 330, situated within the computing environment 302, may perform one or more functions to provide a seamless, engaging, and fair fantasy sports experience. The management service 330 may oversee the reception and processing of user submissions, including lineup selections and entry fees, and ensures the accurate calculation and distribution of contest outcomes and payouts. Moreover, the management service 330 may aggregate and analyze vast data sets related to contest dynamics, user behavior, and performance metrics, facilitating the system's decision-making processes and strategic direction. Furthermore, the management service 330 may be adaptive and scalable, capable of adjusting to fluctuations in user demand and contest complexity. This flexibility may allow the computing environment 302 to support an expanding array of fantasy sports contests, adapt to changes in sporting schedules, and incorporate new features or functionalities as the platform evolves.

The management service 330 may comprise one or more sub-services such as the communication service 332 and the processing service 334, each responsible for specific operational aspects. The communication service may ensure efficient data distribution and interaction within the networked environment, while the processing service 334 may handle the analytical and computational tasks necessary for the contest's execution.

The management service 330 may comprise a communication service 332 and a processing service 334. The communication service 332 may manage data exchanges between users' client devices, external resources, and internal computational processes. Moreover, the communication service 332 may ensure the timely and secure transmission of information, facilitating real-time interactions and access to up-to-date contest data, such as user registration details, player selections, and the outcomes of sporting events that influence contest results.

The processing service 334 within the computing environment 302 may execute a broad spectrum of analytical and computational duties associated with for the operation and enhancement of the platform. The processing service may comprise one or more specialized sub-services, including the experience service 336, skill service 338, projection service 340, assessment service 342, grouping service 344, and analytics service 346, each providing a specific aspect of the P2P fantasy sports contest ecosystem. Cumulatively, these services may perform functions such as skill level assessment, experience tracking, outcome prediction, and the generation of insightful analytics. Through its comprehensive data processing capabilities, the processing service 334 enables the platform to offer personalized contest experiences, maintain competitive balance, and continuously enhance the platform based on user feedback and performance analytics.

The experience service 336 may evaluate and categorize the experience levels of users 102 participating in the platform. Utilizing a comprehensive dataset (e.g., experience data 320), the experience service 336 may determine an experience metric for each user. The metric may encompass a variety of factors, such as the length of user engagement with the platform, the diversity and frequency of contest participation, as well as outcomes and interactions within the system. By quantifying such elements, the experience service 336 may assigns a value to each user's experience level, facilitating a nuanced understanding of user engagement and expertise within the fantasy sports domain.

The experience service 336 may categorize users based on the determined experience metrics by comparing them against predefined experience thresholds. This categorization process may ensure that users are appropriately grouped, which serves multiple purposes: it enhances matchmaking by aligning users of similar experience levels, informs the customization of content and challenges to suit user proficiency, and aids in the tailored distribution of educational resources or incentives designed to foster user growth and retention. This dynamic and adaptive approach allows the P2P fantasy sports system to maintain a balanced and engaging platform, encouraging equitable competition, and ultimately contributing to a vibrant and diverse community of fantasy sports enthusiasts.

The skill service 338 may determine skill levels of users 102. The skill service 338 may receive skill data 322. Based on the skill data 322, the skill service 338 may evaluate each user's performance, strategy effectiveness, and/or overall success rate within the contests. By analyzing outcomes, win-loss records, and/or intricacy of employed strategies, the skill service 338 may determine a skill metric for each user. The skill metric may provide an understanding of each user's capabilities and proficiency in navigating the competitive landscape of fantasy sports.

Moreover, the skill service 338 may categorize users according to their respective skill levels. By comparing the determined metrics with one or more skill thresholds, the skill service 338 may place users within a structured skill hierarchy. This categorization may not only facilitate fair and balanced matchmaking by pairing users with similar skill levels but also enables the system to tailor content, challenges, fostering a competitive yet accessible environment that accommodates users of all skill levels, promoting growth, engagement, and a sustained interest in the P2P fantasy sports ecosystem.

The projection service 340 may perform analysis and valuation of projections made by users 102. Utilizing projections data 316, projection service 340 may evaluate the selections made by each user, which may include a range of attributes such as a number of selected players, which sport(s) are associated with the selections, timing of event(s) associated with the selections, player performance, game outcomes, and statistical milestones. The projection service 340 may aggregate the user selections and assesses the choices across various dimensions, including player form, team dynamics, and historical data, to determine a value for each user's projections. This value may reflect the sport, timing, and/or expected performance level, as well as the strategic acumen behind each selection. Further, the projection service 340 may provide users 102 with insights into the potential outcomes of their fantasy selections. By assigning a projections value, the projection service 340 may allow users 102 to gauge the strength and potential success of their lineup choices relative to the real-world performances of athletes and teams.

The assessment service 342 may evaluate each user's overall standing within the platform. By aggregating inputs from the experience service 336, which offers insights into users' engagement levels and historical performance, the skill service 338, which evaluates the users' ability to make successful predictions, and the projection service 340, which assesses the accuracy and strategic value of users' projections, the assessment service 342 may provide a comprehensive overview of each user's proficiency and prowess in the P2P fantasy sports contests. This multifaceted approach may ensure that the assessment is reflective of not only the users' past achievements and experience but also their strategic thinking and predictive accuracy.

Moreover, the assessment determined by the assessment service 342 may serve multiple purposes within the P2P fantasy sports ecosystem. For example, the assessment service 342 may provide one or more inputs for matching users with similar skill levels and experience, promoting fair play and competitive balance across the platform. Additionally, the assessment service 342 may provide inputs for tailoring the platform's content and challenges to fit the unique profile of each user, enhancing their engagement and overall experience. Through the evaluation and integration of diverse performance metrics, the assessment service 342 may ensure that each user's contribution to the platform is accurately recognized and rewarded, fostering a dynamic and competitive environment for all participants.

The grouping service 344 may determine user groupings that enhance the competitive integrity and engagement of fantasy sports contests. The grouping service 344 may receive one or more inputs from the experience service 336, the skill service 338, the projection service 340, and/or the assessment service 342. For example, the grouping service 344 may analyzes users' performance metrics, skill levels, strategic aptitudes, and overall assessments (e.g., received from the assessment service) to form groups. Moreover, the grouping service 344 may analyze one or more of the number of players, sport(s) in which the players compete, and/or timing of the events associated with the users' selections. This approach may ensure that users are matched in a manner that fosters competitive balance, aligning individuals with similar prowess and experience levels. By doing so, the grouping service 344 may provide a fair and stimulating competition environment, where each user's chances of success are not predetermined by mismatched groupings.

The grouping service 344 may utilize one or more sophisticated algorithms that consider the comprehensive data provided by the assessment service 342 to arrange users into groups where their respective skills and experiences may be best challenged and utilized. For example, diverse contest pools or groupings may be formed based on number of selected players in the projections, sport(s) associated with the projections, timing of events associated with the projections, skill ratings, historical success rates, and the complexity of the projections users tend to select. Moreover, grouping logic employed by the grouping service 344 may be dynamic, allowing for adjustments as users' skills and experiences evolve over time, ensuring the long-term viability and fairness of the grouping system. This dynamic, data-driven approach may not only maximize user engagement by ensuring competitive matchups but may also support the growth of users by matching them against appropriately challenging opponents, thereby enhancing the overall user experience within the P2P fantasy sports platform.

The analytics service 346 may perform one or more data analytics operations. By utilizing a vast array of data sources, such as user performance metrics, game outcomes, player statistics, and more, the analytics service 346 may perform in-depth analyses to uncover patterns, trends, and insights that are pivotal for strategic decision-making and platform optimization. This analytics service 346 may further enable offerings of more personalized recommendations, may improve contest matching algorithms, and may provide users with valuable feedback on their performance. By analyzing the success rates of different strategies and the performance of users under various conditions, the analytics service 346 may identify key factors contributing to user success or failure, facilitating continuous improvement of the P2P fantasy sports platform.

Moreover, the analytics service 346 may contribute to enhancing user engagement and retention strategies. For example, the analytics service 346 may determine one or more of tailored marketing messages, personalized game recommendations, and targeted incentives designed to boost participation. The analytics service 346 may utilize predictive analytics capabilities to forecast user behavior, helping to proactively address potential churn by identifying users at risk of disengagement and deploying strategies to re-engage them. Through the systematic analysis of user data, the analytics service 346 may ensure that the P2P fantasy sports system remains a dynamic, user-centric platform that evolves in line with user needs and preferences, thereby sustaining its attractiveness and competitiveness in the market.

Figure 4:
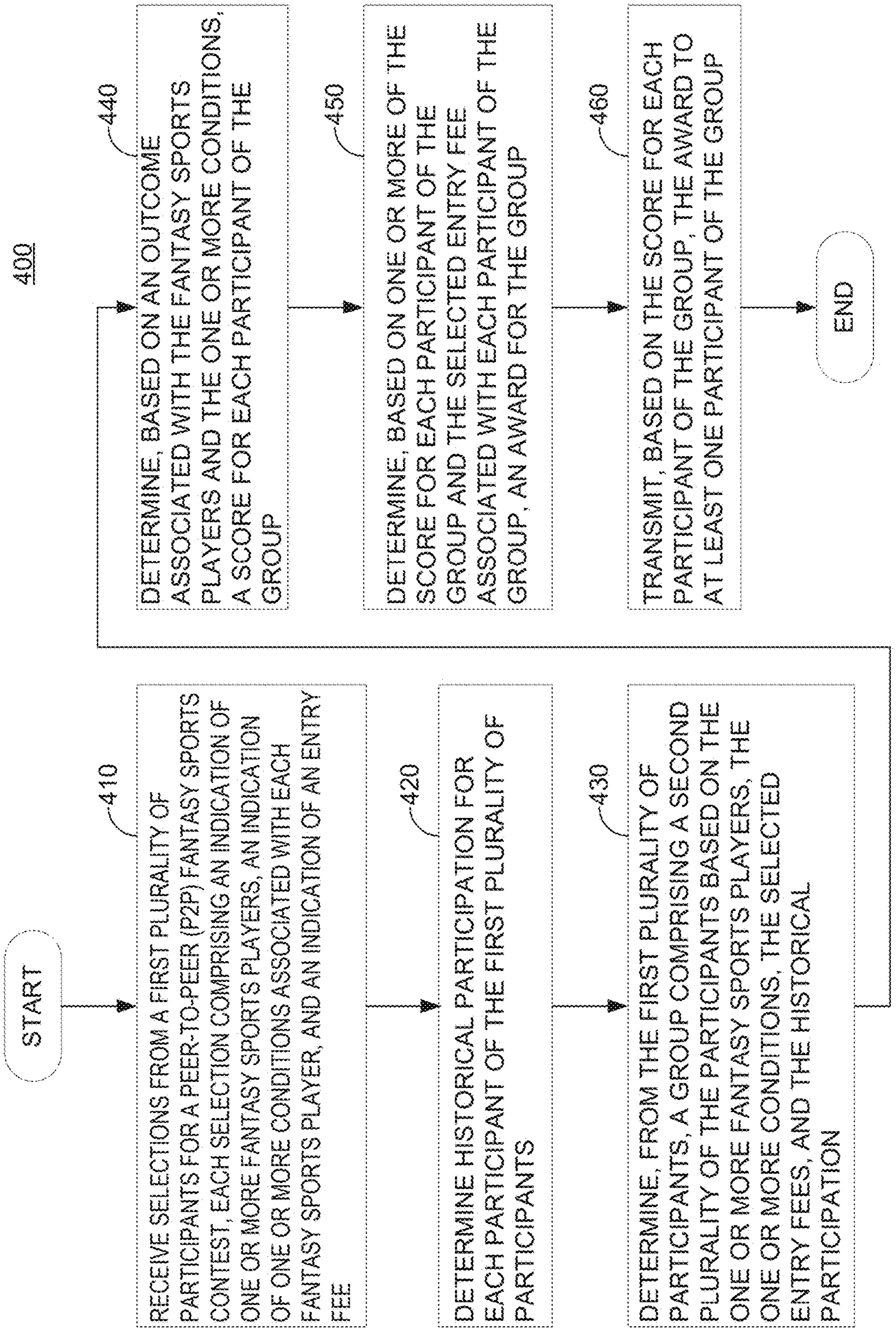
FIG. 4 illustrates an exemplary process for forming player groups in P2P fantasy sports contests and determining group payouts based on payout selection criteria, experience, and skill level of individual group members according to various embodiments of the present disclosure.

Referring now to FIG. 4, illustrated is a flowchart of a process 400, according to one example of the disclosed systems and processes. The process 400 may demonstrate a technique for one or more of forming user groups in P2P fantasy sports contests based on one or more of selections by the user (e.g., selected projections or selected entry fees) and historical participation (e.g., skill, experience, etc.). The process 400 may further demonstrate a technique for determining group payouts to be awarded to the user groups.

Referring now to FIG. 4, illustrated is a flowchart of a process 400, according to one example of the disclosed systems and processes. The process 400 may demonstrate a technique for one or more of forming user groups in P2P fantasy sports contests based on one or more of selections by the user (e.g., selected projections or selected entry fees) and historical participation (e.g., skill, experience, etc.). The process 400 may further demonstrate a technique for determining group payouts to be awarded to the user groups.

At box 410, the process 400 may include receiving selections from a first plurality of participants for a peer-to-peer (P2P) fantasy sports contest, each selection comprising an indication of one or more fantasy sports players (e.g., 2 to 6 players), an indication of one or more conditions associated with each fantasy sports player (e.g., sports in which they participate, timing of their events, positions played, etc.), and an indication of an entry fee. The player selection interface 104, depicted in FIG. 1, may serve as a portal through which users 102, denoted as 102*a* through 102*n*, may engage with the platform. The player selection interface 104 may support a wide variety of strategic decisions, ranging from the selection of fantasy sports players (e.g., labeled as 106*a* through 106*n*) from diverse sporting events across multiple leagues, to determining specific outcomes for these players. The selections may be associated with a number of players (e.g., between 2 and 6 players), the sports the selected players participate in, and the timing of the selected players' scheduled games. An example may include users deciding whether an NFL quarterback will achieve more or less than a predetermined number of touchdowns in a forthcoming game and deciding whether a running back will achieve more or less than a predetermined number of rushing yards in the same forthcoming game. Entry fees for each user may also be captured, laying the groundwork for the P2P fantasy contest by encompassing users' financial commitments and strategic choices.

The comprehensive approach of the process 400 may facilitate access via a multitude of devices, ensuring users may participate regardless of their location. Moreover, the system may cater to a broad spectrum of fantasy sports enthusiasts, from novices exploring the realm for the first time to veterans sharpening their strategic acumen. Receiving selections may involve more than receiving players chosen by the users, such as also receiving the user's speculations on various performance-related outcomes.

At box 420, the process 400 may include determining historical participation for each participant of the first plurality of participants. Following the collection of user selections, the process 400 may receive, analyze, and/or evaluate the historical participation data of each contestant. The process 400 may perform an evaluation or analysis of users' past performances, skill levels, and experiences within the P2P fantasy sports contests. For example, the process 400 may evaluate user 102*b*'s track record, win-loss ratio, consistency, and strategic decisions in previous contests. This analysis may enhance the process 400's understanding of the depth of each participant's engagement with the platform, enabling the system to make informed decisions in the subsequent grouping phase.

The process 400 may utilize the database 206 and server 204 infrastructure to collectively store and process comprehensive profiles on users' engagement histories. By leveraging this data, the process 400 may enhance competitive fairness, ensuring users are matched in environments that reflect their proficiency levels.

At box 430, the process 400 may include determining, from the first plurality of participants, a group comprising a second plurality of the participants based on the one or more fantasy sports players (e.g., number of selected players, sports in which the players participate, and/or timing of the events associated with the players), the one or more conditions, the selected entry fees, and the historical participation. Utilizing the advanced capabilities of the group formation module 208, the process 400 may determine groups that reflect a balanced mix of skill, experience, and strategic intent. For example, the process 400 may place user 102*b*, known for their high engagement and strategic depth, in a group that matches their level of expertise and competitive spirit. The grouping mechanism, as detailed in FIG. 2, reflects a sophisticated algorithmic approach that aims to match users in a way that maximizes the contest's integrity and participants' enjoyment.

At box 440, the process 400 may include determining, based on an outcome associated with the fantasy sports players and the one or more conditions, a score for each participant of the group. Process 400 may determine real-world performances of the selected fantasy sports players and the accuracy of participants' conditions or predictions associated with these players, quantifying the strategic selections made by users 102, turning speculative outcomes into measurable scores. For instance, if user 102*b* predicted a quarterback would exceed a performance metric, and this comes to pass, their score reflects this accurate foresight.

Scoring is a complex calculation, reliant on the up-to-date player data 314 and the outcomes of sporting events. Moreover, process 400 may utilize advanced processing capabilities to synthesize data from various sources to assign scores that are reflective of each participant's predictive accuracy and strategic decisions.

At box 450, the process 400 may include determining, based on one or more of the scores for each participant of the group and the selected entry fee associated with each participant of the group, an award for the group. The determination of awards for each group may be based on the scores achieved by participants and their respective entry fees, ensuring that the awards are distributed in a manner that reflects the competitive landscape of the contest. For instance, a high-scoring participant who entered with a higher fee might see a correspondingly higher reward, aligning the risk and reward paradigm inherent in the contest. Process 400 may leverage the server 204 and database 206 to assess scores and entry fees, ensuring the payout structure is both fair and enticing for participants.

At box 460, the process 400 may include transmitting, based on the score for each participant of the group, the award to at least one participant of the group. For example, process 400 may distribute awards to participants based on their performance, while reinforcing the fairness and attractiveness of the platform. According to some aspects, process 400 may distribute a monetary reward to one or more users for their astute predictions or may otherwise recognize strategic excellence (e.g., via scoring or user reputation), ensuring participants feel valued and motivated to engage in future contests. The transmission of awards may be facilitated by the network 202 and server 204 infrastructure, ensuring a seamless and secure delivery of rewards.

Each box of process 400 underscores the system's comprehensive approach to hosting P2P fantasy sports contests. From the initial participant selections through to the awarding of prizes, process 400 may foster a fair, engaging, and strategically rich contest environment, leveraging advanced technology and data analytics to enhance the user experience.

Figure 5:
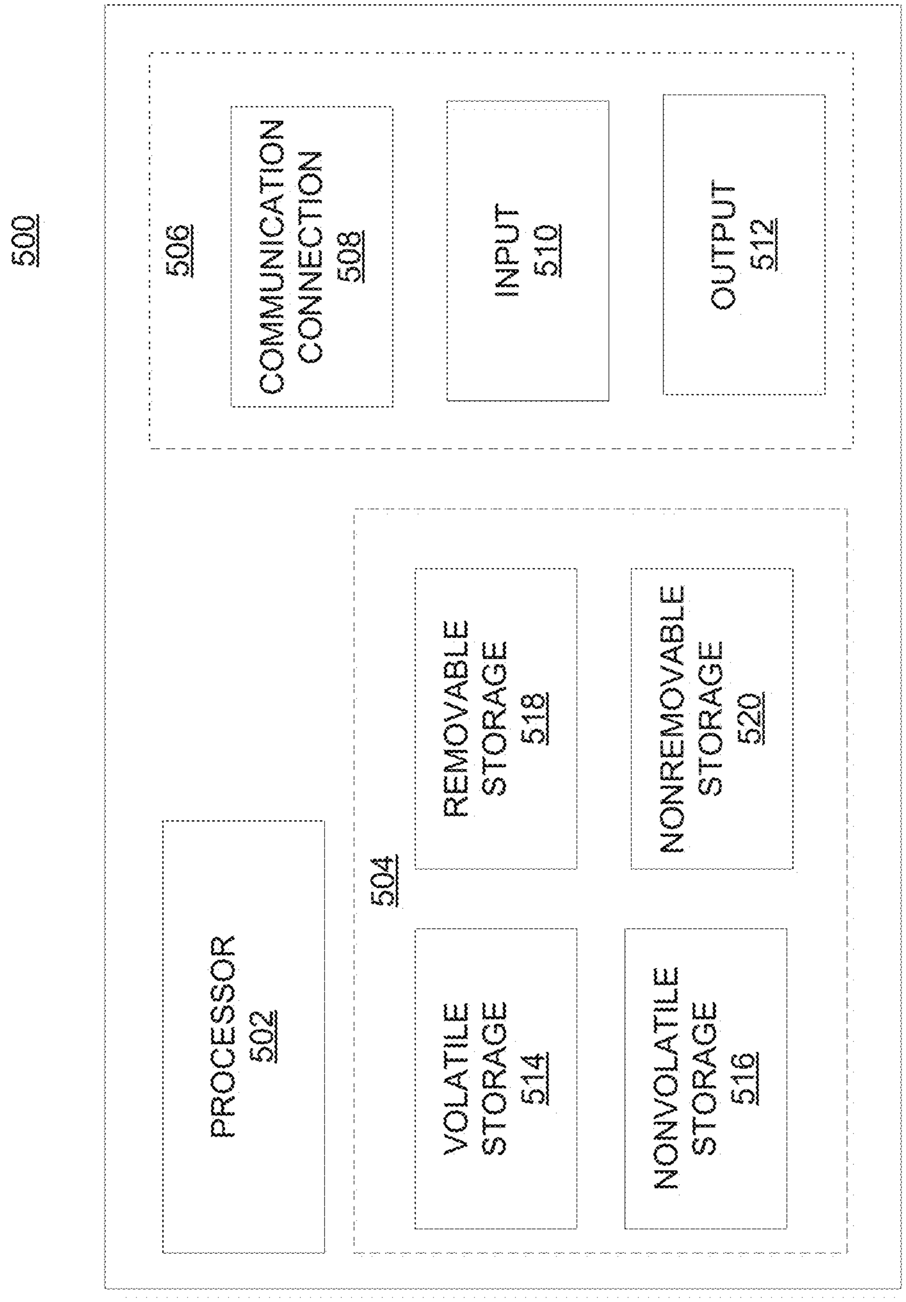
FIG. 5 illustrates a schematic of an exemplary device according to various embodiments of the present disclosure.

FIG. 5 is a block diagram of a computing device 500 that may be connected to or comprise a component of environment 200. Computing device 500 may comprise hardware or a combination of hardware and software. The functionality to facilitate P2P fantasy sports contests may reside in one or a combination of computing devices 500. Computing device 500 depicted in FIG. 5 may represent or perform functionality of an appropriate computing device 500, or a combination of computing devices 500, such as, for example, a component or various components of a P2P fantasy sports contest system, a computing device, a processor, a server, a gateway, a database, a firewall, a router, a switch, a modem, an encryption tool, a virtual private network (VPN), a network access control (NAC) device, a secure web gateway, or the like, or any appropriate combination thereof. It is emphasized that the block diagram depicted in FIG. 5 is exemplary and not intended to imply a limitation to a specific example or configuration. Thus, computing device 500 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Computing device 500 may comprise a processor 502 and a memory 504 coupled to processor 502. Memory 504 may contain executable instructions that, when executed by processor 502, cause processor 502 to effectuate operations associated with a P2P fantasy sports contest. As evident from the description herein, computing device 500 is not to be construed as software per se.

In addition to processor 502 and memory 504, computing device 500 may include an input/output system 506. Processor 502, memory 504, and input/output system 506 may be coupled together (coupling not shown in FIG. 5) to allow communications between them. Each portion of computing device 500 may comprise circuitry for performing functions associated with each respective portion. Thus, each portion may comprise hardware, or a combination of hardware and software. Accordingly, each portion of computing device 500 is not to be construed as software per se. Input/output system 506 may be capable of receiving or providing information from or to a communications device or other network entities configured for P2P fantasy sports contests. For example, input/output system 506 may include a wireless communication (e.g., 3G/4G/5G/GPS) card. Input/output system 506 may be capable of receiving or sending video information, audio information, control information, image information, data, or any combination thereof. Input/output system 506 may be capable of transferring information with computing device 500. In various configurations, input/output system 506 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 506 may comprise a Wi-Fi finder, a two-way GPS chipset or equivalent, or the like, or a combination thereof.

Input/output system 506 of computing device 500 also may contain a communication connection 508 that allows computing device 500 to communicate with other devices, network entities, or the like. Communication connection 508 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 506 also may include an input device 510 such as keyboard, mouse, pen, voice input device, or touch input device. Input/output system 506 may also include an output device 512, such as a display, speakers, or a printer.

Processor 502 may be capable of performing functions associated with P2P fantasy sports contests, such as functions for forming player groups in P2P fantasy sports contests and determining group payouts based on payout selection criteria, experience, and skill level of individual group members, as described herein. For example, processor 502 may be capable of, in conjunction with any other portion of computing device 500, forming player groups in P2P fantasy sports contests and determining group payouts based on payout selection criteria, experience, and skill level of individual group members, as described herein.

Memory 504 of computing device 500 may comprise a storage medium having a concrete, tangible, physical structure. As is known, a signal does not have a concrete, tangible, physical structure. Memory 504, as well as any computer-readable storage medium described herein, is not to be construed as a signal. Memory 504, as well as any computer-readable storage medium described herein, is not to be construed as a transient signal. Memory 504, as well as any computer-readable storage medium described herein, is not to be construed as a propagating signal. Memory 504, as well as any computer-readable storage medium described herein, is to be construed as an article of manufacture.

Memory 504 may store any information utilized in conjunction with P2P fantasy sports contests. Depending upon the exact configuration or type of processor, memory 504 may include a volatile storage 514 (such as some types of RAM), a nonvolatile storage 516 (such as ROM, flash memory), or a combination thereof. Memory 504 may include additional storage (e.g., a removable storage 518 or a non-removable storage 520) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by computing device 500. Memory 504 may comprise executable instructions that, when executed by processor 502, cause processor 502 to effectuate operations associated with P2P fantasy sports contests.

Figure 6:
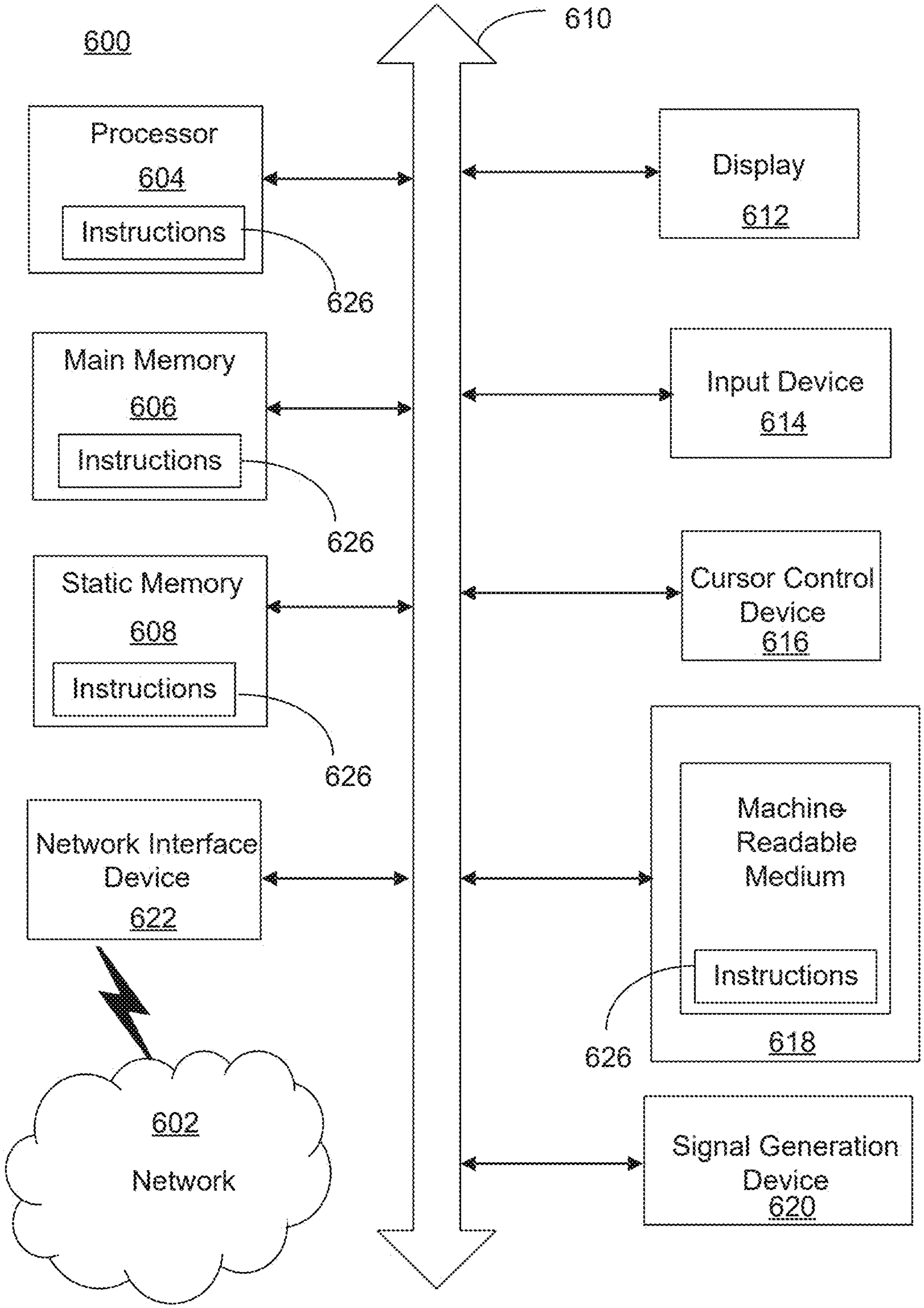
FIG. 6 illustrates an exemplary diagrammatic representation of a machine in the form of a computer system according to various embodiments of the present disclosure.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 502, server 204, database 206, client device 350, and other devices of FIGS. 1-5. In some examples, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid-state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the examples described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium on which is stored one or more sets of instructions (e.g., instructions 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

While examples of a system for P2P fantasy sports contests have been described in connection with various computing devices/processors, the underlying concepts may be applied to any computing device, processor, or system capable of facilitating a P2P fantasy sports contest. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer readable storage medium is not a propagating signal. A computer-readable storage medium as described herein is an article of manufacture. When the program code is loaded into and executed by a machine, such as a computer, the machine becomes a device for P2P fantasy sports contests. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with P2P fantasy sports contests as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an erasable programmable read-only memory (EPROM), a gate array, a programmable logic device (PLD), a client computer, or the like, the machine becomes a device for implementing P2P fantasy sports contests as described herein. When implemented on a general-purpose processor, the program code combines with the processor to provide a unique device that operates to invoke the functionality of a P2P fantasy sports contest.

While the disclosed systems have been described in connection with the various examples of the various figures, it is to be understood that other similar implementations may be used, or modifications and additions may be made to the described examples of a P2P fantasy sports contest system without deviating therefrom. For example, one skilled in the art will recognize that a P2P fantasy sports contest system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—forming player groups in P2P fantasy sports contests and determining group payouts based on payout selection criteria, experience, and skill level of individual group members—as illustrated in the Figures, specific terminology is employed for the sake of clarity. The claimed subject matter, however, is not intended to be limited to the specific terminology so selected. In addition, the use of the word “or” is generally used inclusively unless otherwise provided herein.

This written description uses examples to enable any person skilled in the art to practice the claimed subject matter, including making and using any devices or systems and performing any incorporated methods. Other variations of the examples are contemplated herein.

What is claimed is:

1. One or more computing devices, comprising one or more processors, configured to:

generate a user interface comprising a plurality of selections, wherein the user interface is displayed on a plurality of remote client devices each associated with one of a first plurality of participants;

receive inputs from a plurality of input devices, each associated with one of the plurality of remote client devices for a peer-to-peer (P2P) fantasy sports contest, each input comprising an indication of one or more fantasy sports players, an indication of one or more conditions associated with each fantasy sports player, and an indication of an entry fee;

determine historical participation for each participant of the first plurality of participants;

determine, from the first plurality of participants, a group comprising a second plurality of the participants based on the one or more fantasy sports players, the one or more conditions, the entry fee, and the historical participation;

update the user interface to display an indication of the group based on the inputs from the plurality of input devices;

determine, based on an outcome associated with the fantasy sports players and the one or more conditions, a score for each participant of the group;

determine, based on one or more of the score for each participant of the group and the selected entry fee associated with each participant of the group, an award for the group; and transmit, based on the score for each participant of the group, the award to at least one participant of the group.

2. The one or more computing devices of claim 1, further configured to determine one or more participants of the group with a highest score relative to the other participants of the group, wherein the award is transmitted to the one or more participants of the group with the highest score.

3. The one or more computing devices of claim 2, wherein the award is equally divided among the one or more participants of the group with the highest score.

4. The one or more computing devices of claim 1, wherein the historical participation comprises one or more of prior contest participations, prior selections of fantasy sports players, conditions associated with past selections, and outcomes associated with past selections.

5. The one or more computing devices of claim 1, further configured to determine, for each participant of the first plurality of participants, an experience level, wherein the historical participation is based on the experience level.

6. The one or more computing devices of claim 5, wherein the experience level is determined based on prior participation in P2P fantasy sports contests.

7. The one or more computing devices of claim 1, further configured to determine, for each participant of the first plurality of participants, a skill level, wherein the historical participation is based on the skill level.

8. The one or more computing devices of claim 7, wherein the skill level is determined based on an accuracy of one or more past selections and one or more past conditions.

9. The one or more computing devices of claim 7, further configured to update the skill level based on the outcome associated with the fantasy sports players and the one or more conditions.

10. The one or more computing devices of claim 6, further configured to generate a real-time leaderboard for the group.

11. A method performed by one or more computing devices, the method comprising:

generating a user interface comprising a plurality of selections, wherein the user interface is displayed on a plurality of remote client devices each associated with one of a first plurality of participants;

receiving inputs from a plurality of input devices, each associated with one of the plurality of remote client devices for a peer-to-peer (P2P) fantasy sports contest, each input comprising an indication of one or more fantasy sports players, an indication of one or more conditions associated with each fantasy sports player, and an indication of an entry fee;

determining historical participation for each participant of the first plurality of participants;

determining, from the first plurality of participants, a group comprising a second plurality of the participants based on the one or more fantasy sports players, the one or more conditions, the entry fee, and the historical participation;

updating the user interface to display an indication of the group based on the inputs from the plurality of input devices;

determining, based on an outcome associated with the fantasy sports players and the one or more conditions, a score for each participant of the group;

determining, based on one or more of the score for each participant of the group and the selected entry fee associated with each participant of the group, an award for the group; and transmitting, based on the score for each participant of the group, the award to at least one participant of the group.

12. The method of claim 11, further comprising determining one or more participants of the group with a highest score relative to the other participants of the group, wherein the award is transmitted to the one or more participants of the group with the highest score.

13. The method of claim 12, wherein the award is equally divided among the one or more participants of the group with the highest score.

14. The method of claim 11, wherein the historical participation comprises one or more of prior contest participations, prior selections of fantasy sports players, conditions associated with past selections, and outcomes associated with past selections.

15. The method of claim 11, further comprising determining, for each participant of the first plurality of participants, an experience level, wherein the historical participation is based on the experience level.

16. The method of claim 15, wherein the experience level is determined based on prior participation in P2P fantasy sports contests.

17. The method of claim 11, further comprising determining, for each participant of the first plurality of participants, a skill level, wherein the historical participation is based on the skill level.

18. The method of claim 17, wherein the skill level is determined based on an accuracy of one or more past selections and one or more past conditions.

19. The method of claim 17, further comprising updating the skill level based on the outcome associated with the fantasy sports players and the one or more conditions.

20. A system comprising: one or more processors; and memory coupled with the one or more processors, the memory storing executable instructions that when executed by the one or more processors cause the one or more processors to effectuate operations comprising:

generating a user interface comprising a plurality of selections, wherein the user interface is displayed on a plurality of remote client devices each associated with one of a first plurality of participants;

receiving inputs from a plurality of input devices, each associated with one of the plurality of remote client devices for a peer-to-peer (P2P) fantasy sports contest, each input selection comprising an indication of one or more fantasy sports players, an indication of one or more conditions associated with each fantasy sports player, and an indication of an entry fee;

determining historical participation for each participant of the first plurality of participants;

determining, from the first plurality of participants, a group comprising a second plurality of the participants based on the one or more fantasy sports players, the one or more conditions, the entry fee, and the historical participation;

determining, based on an outcome associated with the fantasy sports players and the one or more conditions, a score for each participant of the group;

updating the user interface to display an indication of the group based on the inputs from the plurality of input devices;

determining, based on one or more of the score for each participant of the group and the selected entry fee associated with each participant of the group, an award for the group; and transmitting, based on the score for each participant of the group, the award to at least one participant of the group.

* * * * *